ISOMETRIC DRAFTING CONVERTER

Filed May 31, 1968 2 Sheets-Sheet 1

INVENTORS
ANDRE A. BAUDAT
C. JOHN EDWARDS
BY
Christensen, Sanborn & Matthews
ATTORNEYS July 29, 1969 A. A. BAUDAT ET AL 3,457,648

ISOMETRIC DRAFTING CONVERTER

Filed May 31, 1968 2 Sheets-Sheet 2

INVENTORS
ANDRE A. BAUDAT
C. JOHN EDWARDS
BY
Christensen, Sanborn & Matthews
ATTORNEYS United States Patent Office 3,457,648
Patented July 29, 1969

3,457,648
ISOMETRIC DRAFTING CONVERTER

Andre A. Baudat, Seattle, and C. John Edwards, Redmond, Wash., assignors to The Boeing Company, Seattle, Wash., a corporation of Delaware
Filed May 31, 1968, Ser. No. 733,667
Int. Cl. B43l 13/14
U.S. Cl. 33—77 9 Claims

ABSTRACT OF THE DISCLOSURE

A three part instrument is disclosed for converting individual orthographic drawing views to tracing guides useful in the preparation of isometric drawings. A base part includes one member extending in a first direction and another member extending in a direction 75° from the first direction. An intermediate part includes two members, one of which is engaged for sliding along the first member of the base part and the second member of which is used as a guiding arm extending 105° from the first direction. The third part includes a cam portion and a straight edge portion. The cam portion has surfaces extending 75° and 105° from the first direction and the straight edge extends 165° from the first direction.

CROSS-REFERENCE TO RELATED APPLICATION

While this application is directed to one type of apparatus for convering orthophotographic images into tracing guides for producing isometric drawings, another type of apparatus for the same purpose is disclosed and claimed in the copending application having a common assignee, Ser. No. 733,384 filed May 31, 1968, entitled "Apparatus for Making Oblique Prints From Orthographic Drawings."

BACKGROUND OF THE INVENTION

Field of the invention

This invention relates to an instrument for producing tracing guides from orthographic drawings suitable for use in the preparation of isometric drawings.

DESCRIPTION OF THE PRIOR ART

Several techniques have been developed over the course of years of draftsmen in an attempt to simplify the task of converting from orthographic views in isometric views. The simplest combination of instruments for such purpose include the use of a drafting board, a T-square, a 30–60–90 degree triangle, and dividers. The most complex set of drafting aids involves the use of an electronic computer in combination with an electronic position indicating pencil.

If the orthographic drawing is simple and does not include complex geometric forms, the use of the simple triangle and divider system for making the conversion from an orthographic view to an isometric view is not too difficult. If, however, more complex forms are involved in the orthographic drawing, special templates, conversion scales for proper foreshortening and other drafting aids are necessary for the accurate renderings of isometric views. The time required for manually converting from orthographic to isometric drawings using these rudimentary aids makes such conversions an expensive and tedious task. One combination instrument is disclosed in the U.S. patent to Bernier 3,070,894 for assisting in the development of isometric and other axonometric drawings from orthographic drawings. This instrument, however, is somewhat complex in that it is useful for producing a number of different types of axonometric drawings. Another instrument disclosed in the patent to Shick 3,157,-951, has also been developed to make the conversion from orthographic to isometric projections. Still another system for assisting in the development of isometric views is described in the patent to Wolf 3,296,701.

It is therefore seen that manual conversion of orthographic views to isometric views is a tedious, expensive, time consuming procedure which may result in erroneous presentation unless performed by well trained draftsmen. The utilization of complex computers for such a conversion process may result in fast, accurate conversions but the initial equipment and programming cost along with the computer time charges makes such a system only practical in the case of very complex contours and for master layout drawings. Photographic processes, such as disclosed in the patent to Henley 3,280,697, are used for introducing a distortion in the production of oblique prints useful in the conversion process between orthographic and isometric drawings. However such systems require complicated motion mechanism and are time consuming in that a photographic development process is required before the oblique image is in a useful form.

SUMMARY OF THE INVENTION AND OBJECTS

From the foregoing recitation concerning prior art methods and equipment for converting orthographic views to tracing guides for the production of isometric views, it is clear that there is a need for a simply constructed, easily used converting instrument for this purpose. It is therefore the principal object of the instant invention to provide a generally improved apparatus for converting orthographic drawings into tracing guides useful in the production of isometric drawings.

It is another object of the instant invention to provide a converting apparatus which eliminates the requirement for highly trained draftsmen to make the conversion from orthographic drawings to tracing guides useful for producing isometric drawings.

A still further object of the instant invention is to provide a lightweight, low cost, easily operated converting instrument which can be used to produce tracing guides for the production of isometric drawings from orthographic drawings without the requirement for darkroom or light shields and without the time delay caused by film processing An additional object of the instant invention is to provide an instrument which will permit the use of microfilm cards as the input media for the orthographic image and from this produce tracing guides useful for producing isometric views.

A related object of the instant invention is to provide a converting instrument which is easy to fabricate and foolproof in its operation to provide a number of years of accurate service performing the function of converting orthographic drawings of a complex contour nature into tracing guides suitable for the development of isometric drawings.

In accordance with the present invention, a lightweight instrument is positioned over an orthographic drawing and from this a tracing guide is accurately developed. An accurate relative movement between the tracing guide and the orthographic drawing is developed by means of engagement between guiding and cam surfaces of the various components of the instrument. This relative movement is required so that proper foreshortening of lines and angular relationships between lines constituting the generated image are developed to provide an accurate reference guide for the rendering of an isometric drawing.

In the preferred form the instrument consists of three interrelated parts. The base part provides guiding surfaces in a first direction and in a second direction extending 75° from the first direction. The intermediate part is movable along the base piece in the first direction and includes a provision of means for supporting the tracing media and means establishing a guide surface extending in a third direction 105° from the first direction. The third part or actuator is movable relative to the base part and intermediate part and includes cam surfaces extending in the second and third directions and a tracing member having a straight edge extending in a fourth direction 165° from the first direction. As the actuator moves away from one portion of the base part one of its cam surfaces guides along the guiding surface of the base part extending in the second direction and another of the cam surfaces engages the guide surface of the intermediate part extending along the third direction. This movement and cam engagement causes the intermediate part along with tracing media to move in the first direction. At increments of its movement, the straight edge is used as a reference line for draftsmen to trace reference points on the tracing media from the orthographic drawing. This tracing process is continued as the straight edge transits the orthographic image and then the reference points are connected. The resulting image on the tracing media can be used as a tracing guide in the production of isometric drawings.

DESCRIPTION OF THE PREFERRED EMBODIMENTS

Figures 1, 2, 6:
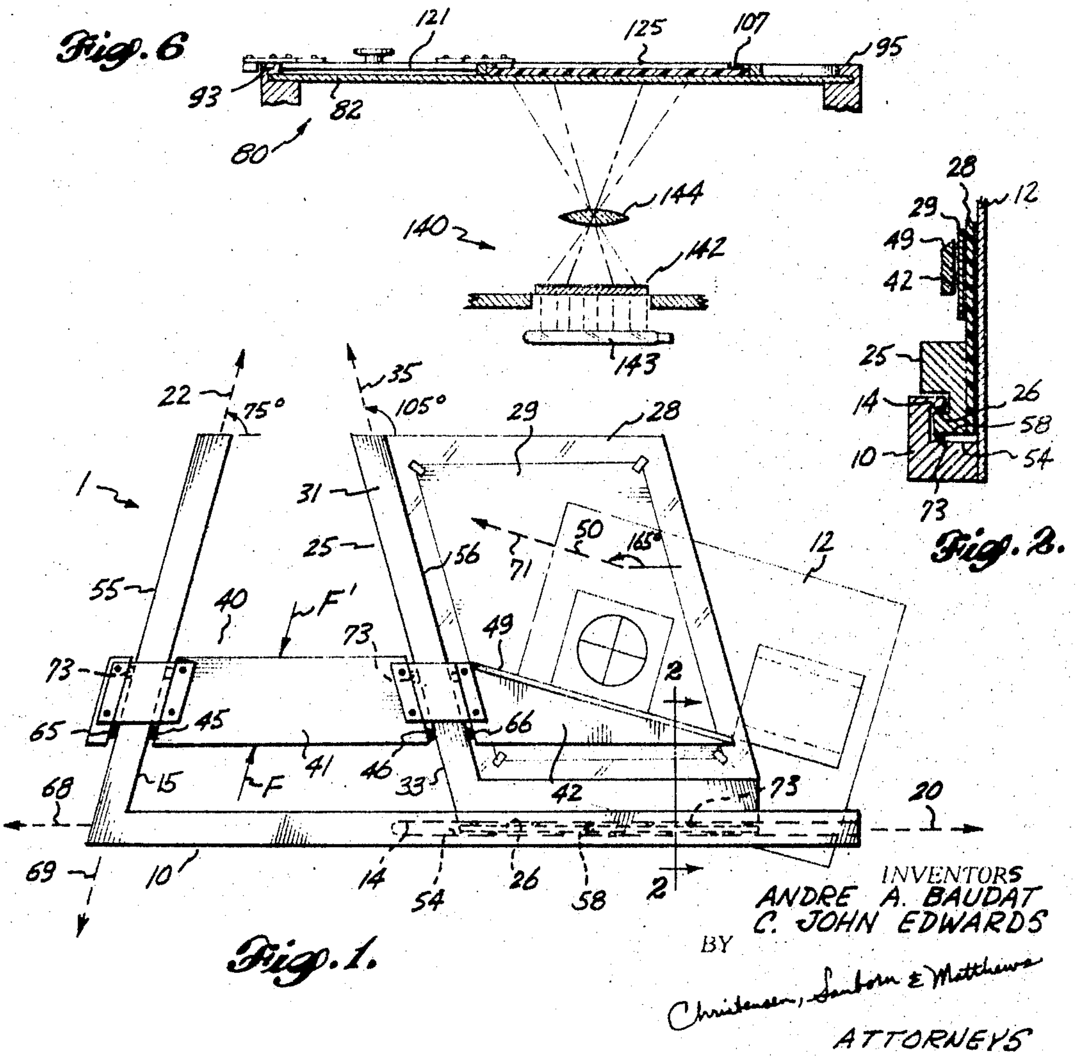
FIGURE 1 is a plan view illustrating the first embodiment of the converter made in accordance with the present invention.
FIGURE 2 is a section view in expanded scale of the converter shown in FIGURE 1 as seen through lines 2—2 of FIGURE 1.
FIGURE 6 is a section of the converter as seen through lines 6—6 of FIGURE 5.

As seen in FIGURE 1 the first embodiment converter 1 includes a base part 10, a movable intermediate part 25 and an actuator part 40. Base part 10 may be made of a transparent material such as Plexiglas and is formed to be set stationarily on an orthographic drawing 12 with its members establishing a first guiding surface 14 extending in a first direction 20 and a second guiding surface 15 extending in a second direction 22, which extends in a direction 75° from the first direction 20.

Intermediate part 25 includes a member defining a first contact surface 26 formed to engage and slide along the first guiding surface 14 in the first direction 20. This relationship between guiding surface 14 and surface 26 is shown in FIGURE 2. Transparent support sheet 28 is attached to intermediate part 25 for supporting a tracing medium sheet 29 in a position coplanar with the orthographic drawing 12. If desired, support sheet 28 may be eliminated with medium sheet 29 secured to intermediate part 25 by other means such as double sided tape. Intermediate part 25 also includes a guide member 31 which establishes in one of its surfaces guiding surface 33 extending in a third direction 35, 105° from the first direction 20.

Actuator 40 includes a cam means 41 and a tracing member 42 extending from the cam means 41. Tracing member 42 includes a straight edge 49 defined by one edge thereof extending in a fourth direction 50, 165° from said first direction 20. Cam means 41 defines within its second cam surface 45 extending in said second direction 22 and a third cam surface 46 extending in said third direction 35. The second and third cam surfaces 45 and 46 are spaced from one another for slidable engagement with and movement along the base and intermediate parts 10 and 25, respectively. As shown, second cam surface 45 engages and slides along second guiding surface 15 and third cam surface 46 engages and slides along third guiding surface 33 as a force F applied to actuator part 40 in the second direction 22 causes the intermediate part 25 to move in said first direction 20. This movement causes straight edge 49 to transit across the orthographic image 12 in said second direction 22 which is generally normal to straight edge 49.

Figure 3:
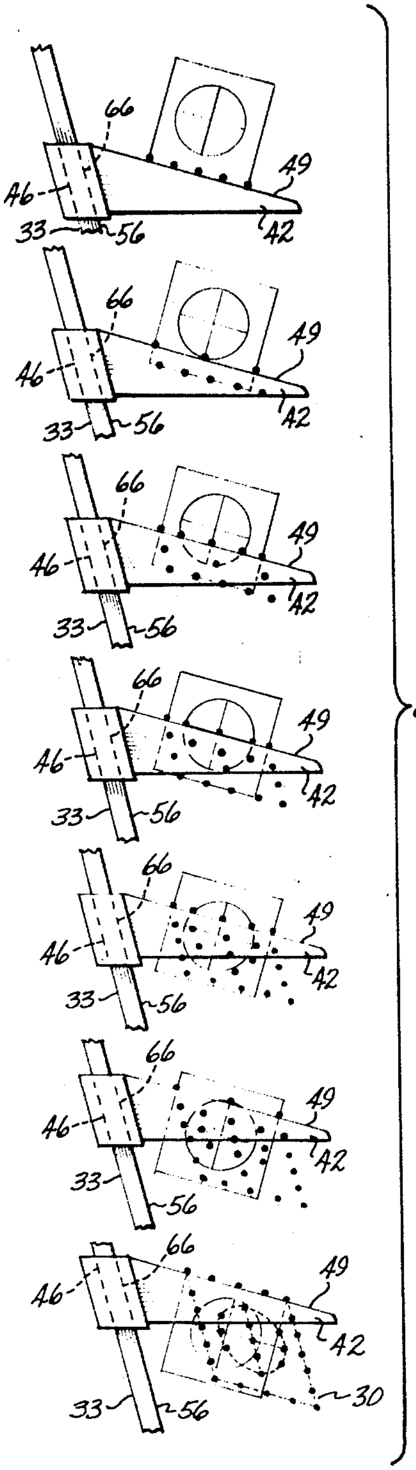
FIGURE 3 is a plan view sequence drawing illustrating the steps involved in utilizing the first embodiment converter made in accordance with the present invention.

To provide for the generation of an isometric guide image on the tracing media sheet 29, the draftsman merely projects reference lines and points of the orthographic image 12 onto the tracing media sheet 29 along straight edge 49. FIGURE 3 illustrates the sequence of development of an isometric guide image 30 on tracing media sheet 29 from the orthographic drawing 12.

In order that the three parts 10, 25 and 40 can be restored to their initial position as shown in FIGURE 1, base part 10 also defines a fourth guiding surface 54 spaced from but parallel to the first guiding surface 14 and a fifth guiding surface 55 is spaced from but parallel to a second guiding surface 15. Intermediate part 25 also defines a fourth contact surface 58 spaced from but parallel to first contact surface 26. Guide member 31 of the intermediate part 25 defines a sixth guiding surface 56 spaced from but parallel to the third guiding surface 33. The actuator cam means 41 defines fifth cam surface 65 spaced from but parallel to second cam surface 45 and sixth cam surface 66 spaced from but parallel to third cam surface 46. With these various cam, contact and guiding surfaces it is possible to move intermediate part 25 in a fifth direction 68, the reciprocal of first direction 20 when a force F' is applied to cam means 41 in a sixth direction 69, the reciprocal of second direction 22. This movement results when the fifth and sixth cam surfaces 65, 66 engage and slide along fifth and sixth guiding surface 55, 56 respectively causing fourth contact surface 58 to be guided along fourth guiding surface 54.

For ease of alignment, tracing medium support sheet 28 may have defined in it an orthographic reference line 71 extending in said fourth direction 50. To provide an easy sliding relationship between the various components of converter 1, pads 73 made of a low friction material such as nylon or polytetrafluoroethylene may be placed between the sliding surfaces.

Figure 4:
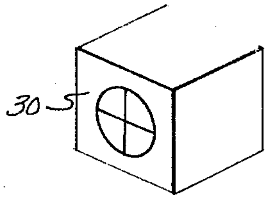
FIGURE 4 is an isometric drawing made by utilization of the sequence shown in FIGURE 3.

In operation converter 1 is placed on an orthographic drawing 12 with orthographic reference line 71 and therefore straight edge 49 positioned parallel to a selected orthographic axis for the particular orthographic view being converted. Actuator 40 is moved in either the second direction 22 or its reciprocal sixth direction 69. The draftsman at selected increments, stops the motion of actuator 40 and marks the tracing media sheet 29 along the straight edge 49 at selected reference points visible through the tracing medium sheet 29 from the orthographic drawing 12. When the completed tracing guide 30 has been generated in this manner, the tracing guide sheet 29 is removed from the suport sheet 28 and used as a tracing guide 30 to develop an isometric drawing such as shown in FIGURE 4.

Figure 5:
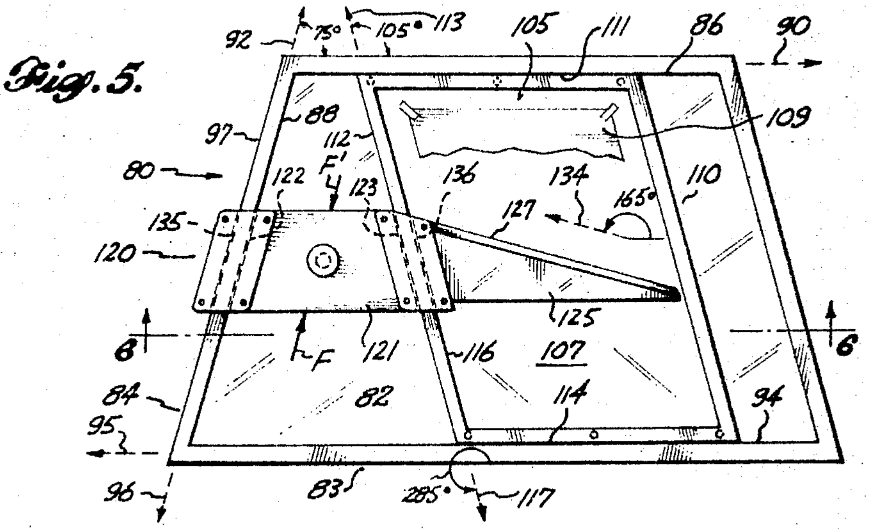
FIGURE 5 is a plan view of the second embodiment of the converter made in accordance with the present invention.

A somewhat more elaborate version of a suitable converter following the principles of the instant invention is the second embodiment 80 illustrated in FIGURES 5 and 6. A generally planar translucent or transparent sheet 82, of glass, acetate or the like, is supported in base part 83 by base part frame members 84. The members of frame 84 define first guide surface 86 extending in a first direction 90; second guide surface 88 extending in a second direction 92, 75° from first direction 90; fourth guide surface 94, extending in a fifth direction 95, the reciprocal of first direction 90; and fifth guide surface 97, extending in a sixth direction 96, the reciprocal of second direction 92.

Intermediate part 105 includes a translucent or transparent support sheet 107 supported by the intermediate frame members 110. The frame members 110 of intermediate part 105 define first contact surface 111, extending in first direction 90; third guide surface 112 extending in a third direction 113, 105° from first direction 90; fourth contact surface 114, extending in fifth direction 95; and sixth guide surface 116 extending in a seventh direction 117, the reciprocal of third direction 113. Frame members 84 of base part 83 are complementally shaped and sized to provide a sliding and guiding relationship with the frame members 110 of intermediate part 105. As shown in FIGURE 5, first guide surface 86 is in sliding contact wtih first contact surface 111, fourth guide surface 94 is in sliding contact with fourth contact surface 114 and support sheet 107 of intermediate part 105 is in sliding contact with sheet 82 of base part 83. A tracing medium sheet 109 is detachably supported by sheet 107.

Actuator 120 includes cam member 121 and tracing member 125. Cam member 121 defines second cam surface 122 and third cam surface 123 spaced from one another and positioned for sliding contact along second guide surface 88 and third guide surface 112, respectively. In addition cam member 121 defines fifth cam surface 135 and sixth cam surface 136 spaced from one another and positioned for sliding contact along fifth guide surface 97 and sixth guide surface 116, respectively. Tracing member 125 includes straight edge 127 defined in one edge thereof extending in a fourth direction 134, 165° from first direction 90. Through the action of these cams and surfaces, as actuator member 120 is subjected to a force F along second direction 92, intermediate part 105 is moved in first direction 90 and as actuator 120 is subjected to a force F′ in said sixth direction 96, intermediate part 105 is moved in the fifth direction 95.

Although the second converter embodiment 80 can that has been described for the first embodiment, it is very be placed upon an orthographic drawing in the same way useful in developing isometric tracing guides from projected images of orthographic views contained in microfilms. As shown in FIGURE 6, a projection system 140 is used to cast an orthographic image through translucent or transparent sheets 82 and 107 from an orthographic image on film sheet 142. A light source 143 is used to project through the film 142 through a suitable lens system, schematically identified as 144, to focus the image through sheets 82 and 107 onto tracing medium sheet 109. Since the operation of the second embodiment 80 is substantially identical to first embodiment 1, no further explanation is warranted.

Figure 7:
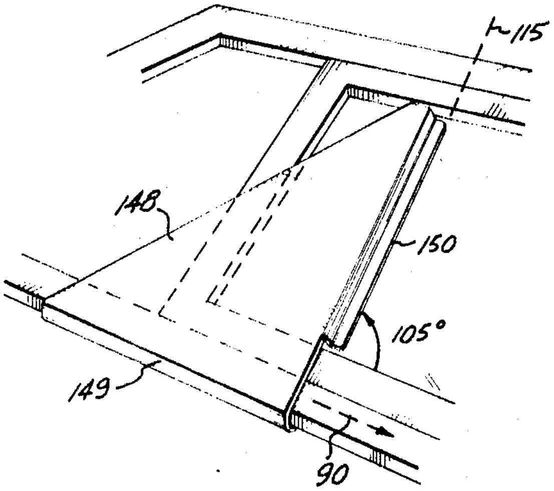
FIGURE 7 is a partial isometric view illustrating an accessory for the second embodiment converter made in accordance with the instant invention.
Figures 8, 9:
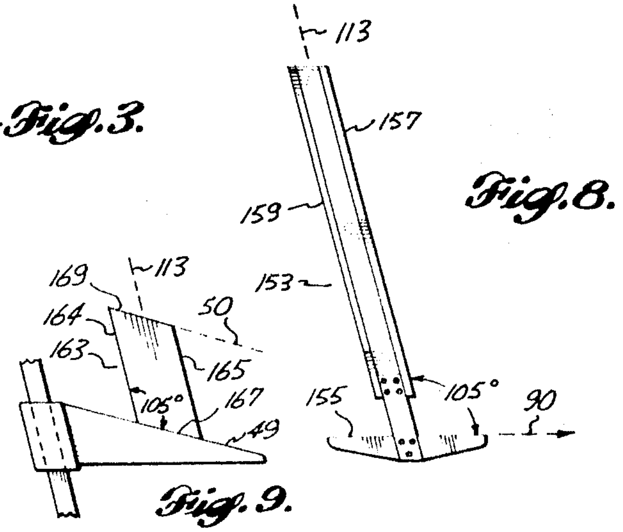
FIGURES 8 and 9 are plan views illustrating T-square and parallelogram accessories useful with the converter made in accordance with the instant invention.

In view of the fact that certain lines of the orthographic drawings, specifically those perpendicular to the selected orthographic axis of the drawing, will be generated in the isometric guide tracing at an angle of 105° from the first direction, three accessories shown in FIGURES 7 to 9 have been developed for ease of drawing such lines. In FIGURE 7 the acecssory is in the form of a delta-shaped member 148 having a guiding edge 149 extending in the first direction 90 and a straight edge 150 defined in another edge extending in a direction of 105° from the first direction 90. In FIGURE 8 a modified T-square 153 is shown having a guide edge 155 extending in said first direction 90 and a pair of parallel straight edges 157 and 159 extending in the third direction 113, that is 105° from first direction 90. In FIGURE 9 a parallelogram 163 is shown with two sides 164 and 165 extending in the third direction 113 when its third side 167 or guiding edge is guided along straight edge 49 extending in the fourth direction 50. Fourth side 169 may be used as a straight edge for lines parallel to straight edge 49.

After the generation of the individual isometric tracing guide images have been completed, following the procedures described herein, each of these guide images is positioned utilizing the conventional isometric reference angles, a tracing sheet is positioned over the guide images and from these an illustrator develops the desired isometric drawing.

From the foregoing it should be clear that there has been provided a significantly simplified apparatus for converting ordinary orthographic drawings into tracing guides suitable for the development therefrom of isometric drawings. The angular relationships provided between the guiding and cam surfaces along with the straight edges results in a foolproof, simple instrument that can be used with accuracy in the development of suitable tracing guides.

What is claimed is:

1. A three part instrument for converting orthographic drawings into tracing guides suitable for development of isometric views comprising:

a base part adapted to set stationarily relative to an orthographic drawing image and having means defining first and second guiding surfaces;

said first guiding surface extending in a first direction;

said second guiding surface extending in a second direction 75° from said first direction;

a movable intermediate part having a first contact surface adapted to engage and slide along said first guiding surface, means for supporting a tracing medium sheet and means defining a third guiding surface;

said third guiding surface extending in a third direction 105° from said first direction;

an actuator having cam means and a tracing member;

said tracing member attached to and movable with said cam means and having a straight edge defined by one edge thereof extending in a fourth direction 165° from said first direction;

said cam means defining second and third cam surfaces;

said second and third cam surfaces being spaced from one another for slidable engagement with and movement along said base and intermediate parts with said second cam surface engaging said second guiding surface and said third cam surface engaging said third guiding surface, whereby a force applied to said cam means in said second direction causes said intermediate part to move in said first direction.

2. The instrument of claim 1 wherein:

said base part also defines a fourth guiding surface spaced from but parallel to said first guiding surface and a fifth guiding surfaces spaced from but parallel to said second guiding surface;

said intermediate part also defines a sixth guiding surface spaced from but parallel to said third guiding surface and a fourth contact surface;

said actuator also defines a fifth and sixth cam surface;

said fifth and sixth cam surfaces being spaced from one another for slidable engagement with and movement along said base and intermediate parts with said fifth cam surface engaging said fifth guiding surface and said sixth cam surface engaging said sixth guiding surface, whereby a force applied to said cam means in a sixth direction 255° from said first direction causes said intermediate part to move in a fifth direction 180° from said first direction with said fourth contact surface sliding along said fourth guiding surface.

3. The instrument of claim 1 wherein:

said support means includes an orthographic reference line extending in said fourth direction.

4. The instrument of claim 1 including:

low friction means inserted between said cam and guiding surfaces.

5. The instrument of claim 1 including:

a projection means including means for projecting an orthographic image and means for focusing said projected image onto said tracing medium sheet.

6. The instrument of claim 1 including:
accessory means including means defining a guiding edge extending in said first direction for guiding along said base part and means defining a second straight edge extending in said third direction.

7. The instrument of claim 1 wherein:
said tracing medium support means being provided by a sheet of acetate.

8. The instrument of claim 1 including:
accessory means including means defining a guiding edge extending in said fourth direction for guiding along said tracing member straight edge and means defining at least one other straight edge extending in said third direction.

9. The instrument of claim 8 wherein:
said accessory forms a parallelogram with two sides extending in said third direction and two other sides extending in said fourth direction.

References Cited

UNITED STATES PATENTS

| | | | |
|---|---|---|---|
| 2,648,908 | 8/1953 | Stone | 33—77 |
| 2,711,024 | 6/1955 | Sachtleber | 33—77 |

HARRY N. HAROIAN, Primary Examiner